United States Patent
Vega et al.

(10) Patent No.: US 6,879,809 B1
(45) Date of Patent: *Apr. 12, 2005

(54) WIRELESS ELECTROSTATIC CHARGING AND COMMUNICATING SYSTEM

(75) Inventors: Victor Allen Vega, Hercules, CA (US); John Howard Rolin, San Jose, CA (US)

(73) Assignee: Motorola, Inc., Schaumburg, IL (US)

( * ) Notice: Subject to any disclaimer, the term of this patent is extended or adjusted under 35 U.S.C. 154(b) by 731 days.

This patent is subject to a terminal disclaimer.

(21) Appl. No.: 09/678,529

(22) Filed: Oct. 3, 2000

Related U.S. Application Data

(63) Continuation of application No. 09/225,265, filed on Jan. 5, 1999, which is a continuation-in-part of application No. 09/061,146, filed on Apr. 16, 1998.

(51) Int. Cl.$^7$ .................................................. H04B 5/00
(52) U.S. Cl. ...................... 455/41.1; 455/572; 455/573
(58) Field of Search ................................ 455/41.1, 41.2, 455/41.3, 39, 73, 76, 91, 343.1, 344, 572–573; 340/10.1, 10.5, 572.1, 572.4, 455

(56) References Cited

U.S. PATENT DOCUMENTS

| | | | | |
|---|---|---|---|---|
| 4,219,872 A | * | 8/1980 | Engelmann | ................ 363/126 |
| 5,175,418 A | * | 12/1992 | Tanaka | ........................ 235/439 |
| 5,426,667 A | | 6/1995 | Van Zon | |
| 5,566,441 A | | 10/1996 | Marsh et al. | |
| 5,682,143 A | | 10/1997 | Brady et al. | |
| 5,724,651 A | | 3/1998 | Takahaski et al. | |
| 5,786,626 A | | 7/1998 | Brady et al. | |
| 5,847,447 A | * | 12/1998 | Rozin et al. | ................ 257/678 |
| 5,850,187 A | | 12/1998 | Carrender et al. | |
| 5,854,480 A | | 12/1998 | Noto | |
| 5,909,463 A | | 6/1999 | Johnson et al. | |
| 5,914,701 A | | 6/1999 | Gersheneld et al. | |
| 6,001,211 A | | 12/1999 | Hiroyuki | |
| 6,072,383 A | * | 6/2000 | Gallagher, III et al. | .... 340/10.2 |
| 6,208,235 B1 | * | 3/2001 | Trontelj | ..................... 340/10.1 |
| 6,275,681 B1 | * | 8/2001 | Vega et al. | ................ 455/41.1 |
| 6,392,386 B2 | * | 5/2002 | Schulmayr et al. | ......... 320/132 |
| 6,642,782 B2 | * | 11/2003 | Beigel et al. | ............... 327/565 |

* cited by examiner

*Primary Examiner*—Sonny Trinh
(74) *Attorney, Agent, or Firm*—Terri S. Hughes; Thomas V. Miller

(57) ABSTRACT

The wireless electrostatic charging and communicating system includes an electrostatic reader, an electrostatic charger and an electrostatic rechargeable device or electrostatic transceiver such as such as a smart card or radio frequency identification (RFID) card without requiring physical contact to electrodes. The electrostatic system is capacitance based and the charging and communicating occurs over capacitively coupled electrostatic electrodes or electrostatic electrodes. The electrostatic rechargeable device or transceiver includes a charge receiver and an energy storage means, for being charged or communicated with in the electrostatic system. The energy storage means may be any energy storage device including a rechargeable battery or capacitor. In a second embodiment, the electrostatic rechargeable device or transceiver includes an electrostatic charge receiver and an electromagnetic charge receiver with the energy storage means so that it may be alternatively charged or communicated with in an electrostatic system or an electromagnetic system for compatibility in either system.

16 Claims, 12 Drawing Sheets

WIRELESS ELECTROSTATIC CHARGING AND COMMUNICATING SYSTEM

CROSS REFERENCE TO RELATED APPLICATIONS

This is a continuation of 09/225,265 filed Jan. 5, 1999, which is a continuation in part of a prior U.S. patent application Ser. No. 09/061,146, filed 16 Apr. 1998 by inventors Ted Geiszler et al, entitled "REMOTELY POWERED ELECTRONIC TAG WITH PLURAL ELECTROSTATIC ANTENNAS AND ASSOCIATED EXCITER/READER AND RELATED METHOD; RADIO FREQUENCY IDENTIFICATION TAG SYSTEM USING TAGS ARRANGED FOR COUPLING TO GROUND; RADIO FREQUENCY IDENTIFICATION TAG ARRANGED FOR MAGNETICALLY STORING TAG STATE INFORMATION; AND RADIO FREQUENCY IDENTIFICATION TAG WITH A PROGRAMMABLE CIRCUIT STATE" and assigned to Motorola, Inc. the disclosure of which prior application is hereby incorporated by reference, verbatim and with the same effect as though it were fully and completely set forth herein.

Additionally, this application is related to U.S. provisional patent application Ser. No. (60/099,927), filed 11 Sep. 1998 by Victor Vega and John Rolin, entitled "ELECTROSTATIC RFID/EAS SYSTEM" which is to be commonly assigned to Motorola, Inc. the disclosure of which is hereby incorporated by reference, verbatim and with the same effect as though it were fully and completely set forth herein, now abandoned.

Additionally, this application is related to U.S. provisional patent application Ser. No. (60/100,016), filed 11 Sep. 1998 by Victor Vega, entitled "CONTACTLESS ELECTROSTATIC RADIO FREQUENCY IDENTIFICATION PROGRAMMABILITY" which is to be commonly assigned to Motorola, Inc. the disclosure of which is hereby incorporated by reference, verbatim and with the same effect as though it were fully and completely set forth herein, now abandoned.

Additionally, this application is related to U.S. provisional patent application Ser. No. (60/100,003), filed 11 Sep. 1998 by Victor Vega, entitled "BODY TOUCH RFID SYSTEM" which is to be commonly assigned to Motorola, Inc. the disclosure of which is hereby incorporated by reference, verbatim and with the same effect as though it were fully and completely set forth herein, now abandoned.

Additionally, this application is related to U.S. patent application Ser. No. (09/226,065), filed on an even date herewith by Victor Vega, entitled "ACTIVE ELECTROSTATIC TRANSCEIVER AND COMMUNICATING SYSTEM" which is to be commonly assigned to Motorola, Inc. the disclosure of which is hereby incorporated by reference, verbatim and with the same effect as though it were fully and completely set forth herein, now U.S. Pat. No. 6,282,407.

Additionally, this application is related to U.S. provisional patent application Ser. No. (60/099,985), filed 11 Sep. 1998 by Victor Vega, entitled "PIEZOELECTRIC CRYSTAL USED FOR DETECTION OF RFID/EAS TAGS" which is to be commonly assigned to Motorola, Inc. the disclosure of which is hereby incorporated by reference, verbatim and with the same effect as though it were fully and completely set forth herein, converted to non-provisional application Ser. No. (09/391,725), now U.S. Pat. No. 6,362,738.

Additionally, this application is related to U.S. provisional patent application Ser. No. (60/099,928), filed 11 Sep. 1998 by Victor Vega, John Hattick and Charles Zimnicki, entitled "GENERATION OF ELECTROSTATIC VOLTAGE POTENTIALS FOR RFID/EAS USING PIEZOELECTRIC CRYSTALS" which is to be commonly assigned to Motorola, Inc. the disclosure of which is hereby incorporated by reference, verbatim and with the same effect as though it were fully and completely set forth herein, now abandoned.

Additionally, this application is related to U.S. patent application Ser. No. 09/151,418, filed 11 Sep. 1998 by Victor Vega, entitled "A CONTACTLESS CAPACITIVE DATA TRANSMISSION SYSTEM AND METHOD" which is to be commonly assigned to Motorola, Inc. the disclosure of which is hereby incorporated by reference, verbatim and with the same effect as though it were fully and completely set forth herein, now abandoned.

FIELD OF THE INVENTION

This invention relates to contactless battery charging systems and wireless communication systems. Particularly the present invention relates to systems for charging and communicating with rechargeable RFID transceivers and smart cards.

BACKGROUND OF THE INVENTION

Battery charging systems are not new. They are used to recharge batteries in many products used today including an automobile, a cordless telephone or cell phone, flashlights, calculators, portable computers, portable stereos, and may be used to directly recharge batteries themselves. Most of these charging systems require some sort of wire connection or physical contact with electrodes in order to recharge a battery.

Inductive or electromagnetic charging systems were introduced in order to charge systems without requiring a physical electrical connection. These were introduced for example in charging a battery in an electric tooth brush or batteries in electric automobiles. These electromagnetic charging systems eliminated the use of physical contacts or electrodes. This avoided the wear on physical contacts or electrodes normally associated with the numerous times a device would be recharged. Additionally the systems were more user friendly in that the devices were easier to recharge. The charging system for an automobile or tooth brush is an inductive or electromagnetic charging system having coils to transmit an electromagnetic field from the battery charger and receive the electromagnetic field in order to generate current within the device being charged. Coils for transmitting and receiving a charge tend to be large and cumbersome making it very difficult to integrate the charging components into a very small area. Previously space was not a large problem because previous battery charged devices, such as the tooth brush and automobile, have sufficient space for the relatively large charging components. Additionally, prior battery charged devices have required large capacity storage and efficient battery charging systems and often times included a magnetic core to increase charging efficiency. A magnetic core added to an inductive charging systems makes it more difficult to integrate a charging system into a very small area.

Today there are systems where it is desirable to manufacture rechargeable active devices at high volumes and low costs thereby increasing the utility and avoiding the early disposal of low cost active devices. An example of these are smart cards where information about a card holder or a card holder's accounts or finances may be stored. To inexpensively manufacture rechargeable active devices such as these, it is desirable to reduce the size of the energy storage components and use less expensive components that may have relatively low storage capacity. Additionally, it is desirable to extend the life of rechargeable active devices by providing smaller energy storage components and eliminating physical contact mechanisms ordinarily used in battery charging systems.

BRIEF SUMMARY OF THE INVENTION

In a first embodiment, the present invention includes an electrostatic system for charging or communicating with an electrostatic rechargeable device or transceiver such as a smart card or radio frequency identification (RFID) card without requiring physical contact to electrodes. The electrostatic system may include an electrostatic reader, an electrostatic charger, an electrostatic programmer or encoder, and an electrostatic transceiver or other electrostatic rechargeable device. The electrostatic rechargeable device or transceiver has components, including a charge receiver and an energy storage means, for being charged by an electrostatic system. The energy storage means may be any energy storage device including a rechargeable battery or capacitor. In a second embodiment, a combination electrostatic/electromagnetic reader is provided so that an active electromagnetic transceiver or an active electrostatic transceiver may have its energy storage means charged. In a third embodiment, the electrostatic rechargeable device or transceiver has components, including an electrostatic charge receiver, an electromagnetic charge receiver and an energy storage device, such that it may be alternatively charged by an electrostatic system or an electromagnetic system for compatibility in either system. In a fourth embodiment, the rechargeable transceiver includes a power manager to automatically select a power source to power the rechargeable transceiver such that it can operate passively or actively.

It is an object of the present invention to charge an electrostatic rechargeable device without physical contact by an electrostatic charger, an electrostatic reader or an electrostatic programmer/encoder.

It is another object of the present invention to optionally charge an electrostatic rechargeable device without physical contact by an electrostatic charger or an electrostatic/electromagnetic charger or electrostatic/electromagnetic reader.

Another object of the present invention is to provide an electrostatic rechargeable device that can be charged by either an electromagnetic communication system or an electrostatic communication system without physical contact.

A still further object of the present invention is to increase the life of a rechargeable electrostatic rechargeable device.

A still further object of the present invention is to decrease the size of the components within a rechargeable system.

Another object of the present invention is to lower the cost of manufacturing of an electrostatic rechargeable device such as a smart card.

DETAILED DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail as not to unnecessarily obscure aspects of the present invention.

The present invention includes a method and apparatus for providing electrostatic ("ES") charging, as well as electrostatic communication, and utilizes capacitance-based technology. Electrostatic charging and communicating is accomplished through capacitive coupling which requires no physical contact or wires between a charger and a rechargeable device being charged or a reader and an electrostatic transceiver. The voltage applied to the capacitively coupled plates is an AC voltage generated by an electric field (i.e. an electrostatic field is developed) as opposed to an electromagnetic ("EM") field in order for a charge or signal to be communicated in the electrostatic charging and communicating system. In short, an electrostatic field is an energy (electrical) field created between two electrodes having a voltage differential. The wireless electrostatic rechargeable device needs to be in the proximity of the charger in order to have sufficient capacitive coupling to receive a charge or signal. A charger can also be an electrostatic reader so that it can not only electrostatically charge a rechargeable device but it can electrostatically communicate with the rechargeable device through the capacitive coupling. Additionally, the components for the electrostatic charging can include additional electromagnetic components so that both electrostatic and electromagnetic charging and communicating can occur.

Figure 1:
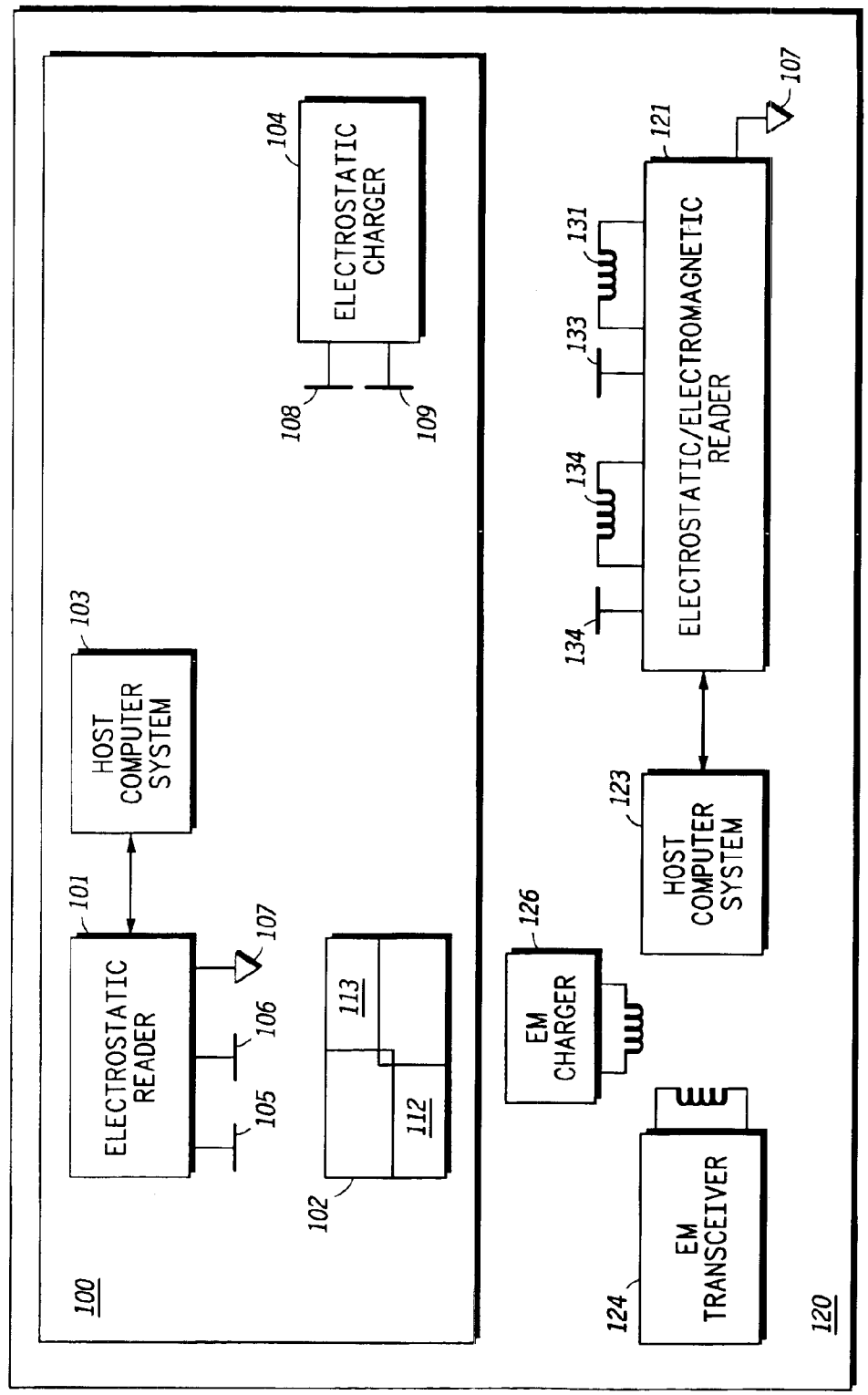
FIG. 1 is a system level diagram of a typical electrostatic system and the combined electrostatic/electromagnetic system of the present invention.

FIG. 1 illustrates the preferred embodiment of the electrostatic communication and charging system 100 which includes electrostatic reader 101, wireless electrostatic rechargeable transceiver 102, host computer system 103 and electrostatic charger 104. Transceivers may also be referred to as transponders or tags. Additionally, FIG. 1 illustrates a second preferred embodiment of the combined electrostatic/electromagnetic communication and charging system 120 which includes the components of the electrostatic communication and charging system 100 and an electrostatic/electromagnetic reader 121, a host computer system 123, an electromagnetic transceiver 124, and an electromagnetic charger 126. It can be appreciated that the invention also encompasses a charging system which includes an electrostatic charger such as charger 104 and any electrostatic rechargeable device having an electrostatic charge receiver and a charge storage capability such as electrostatic transceiver 102. Electrostatic transceiver 102 can transmit and receive information to/from the electrostatic reader 101 or electrostatic/electromagnetic reader 121. Additionally electrostatic transceiver 102 can be charged and re-charged by the electrostatic reader 101, the electrostatic/electromagnetic reader 121 or the electrostatic charger 104. The electrostatic reader 101 and the electrostatic charger 104 each have electrostatic charge transmitters while the electrostatic/electromagnetic reader 121 has a combined electrostatic/electromagnetic charge transmitters. Electromagnetic charger 126 has electromagnetic charge transmitters only. The electrostatic active device or electrostatic transceiver has electrostatic charge receivers while the electromagnetic transceiver has electromagnetic charge receivers and a combined electrostatic/electromagnetic reader 121 has both electrostatic charge receivers and electromagnetic charge receivers. Each of the electrostatic charge receivers and charge transmitters for the respective electrostatic transceiver 102, electrostatic reader 101, and electrostatic charger 104 include electrostatic electrodes which may also be referred to as antenna, capacitor plates, contactless electrodes, wireless electrodes or isolation electrodes. These electrostatic electrodes provide for the antenna, contactless, wireless and the somewhat isolated functionality of the electrostatic system which requires no physical contact between the electrodes in order to charge or communicate. The electrostatic transceiver 102 has at least two electrostatic electrodes which will be referred to herein as electrostatic electrode 112 and electrostatic electrode 113 and simultaneously operate as antenna for communications and electrostatic charge receivers for receiving electrostatic charges. The electrostatic electrodes 105 and 106 of electrostatic reader 101 will be referred to herein as electrostatic electrode 105 and electrostatic electrode 106 and simultaneously operate as antenna for communications and electrostatic charge transmitters for transmitting electrostatic charges. Transceiver circuitry can be implemented in an integrated circuit. The electrostatic electrodes and associated electrical circuits of a wireless electrostatic system can be implemented on flat surfaces including paper, plastic, or synthetic substrates. Moreover, the manufacturing process involved is inexpensive and requires minimal components and set-up. In the preferred application of a smart card or RFID card, the electrostatic electrodes 112 and 113 are conducting plates separated from one another such as illustrated in FIG. 1.

Electrostatic electrodes 112 and 113 are one part of the capacitive plates for capacitive coupling in order to receive electrostatic charges and communications. The other part of the capacitive plates are provided by the electrostatic reader 101, electrostatic/electromagnetic reader 121, or the electrostatic charger 104. The space between the coupled electrostatic electrodes defines the dielectric medium between the two parts of the capacitive plates. The capacitive plates of the reader or charger can be in either a monopole or a dipole configuration. In a monopole configuration, only one set of coupling plates is used. Earth ground acts as a low impedance return path. The electrostatic transceiver may couple to earth ground through a human body or other relatively low impedance that couples to one or the other of the electrostatic electrodes.

Figure 2A:
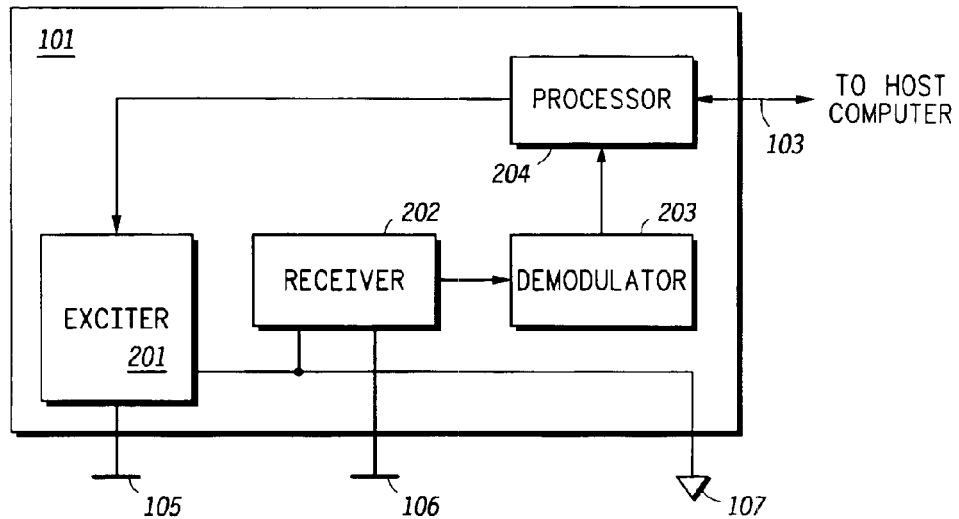
FIG. 2A is a block diagram of the electrostatic reader of FIG. 1.
Figure 2B:
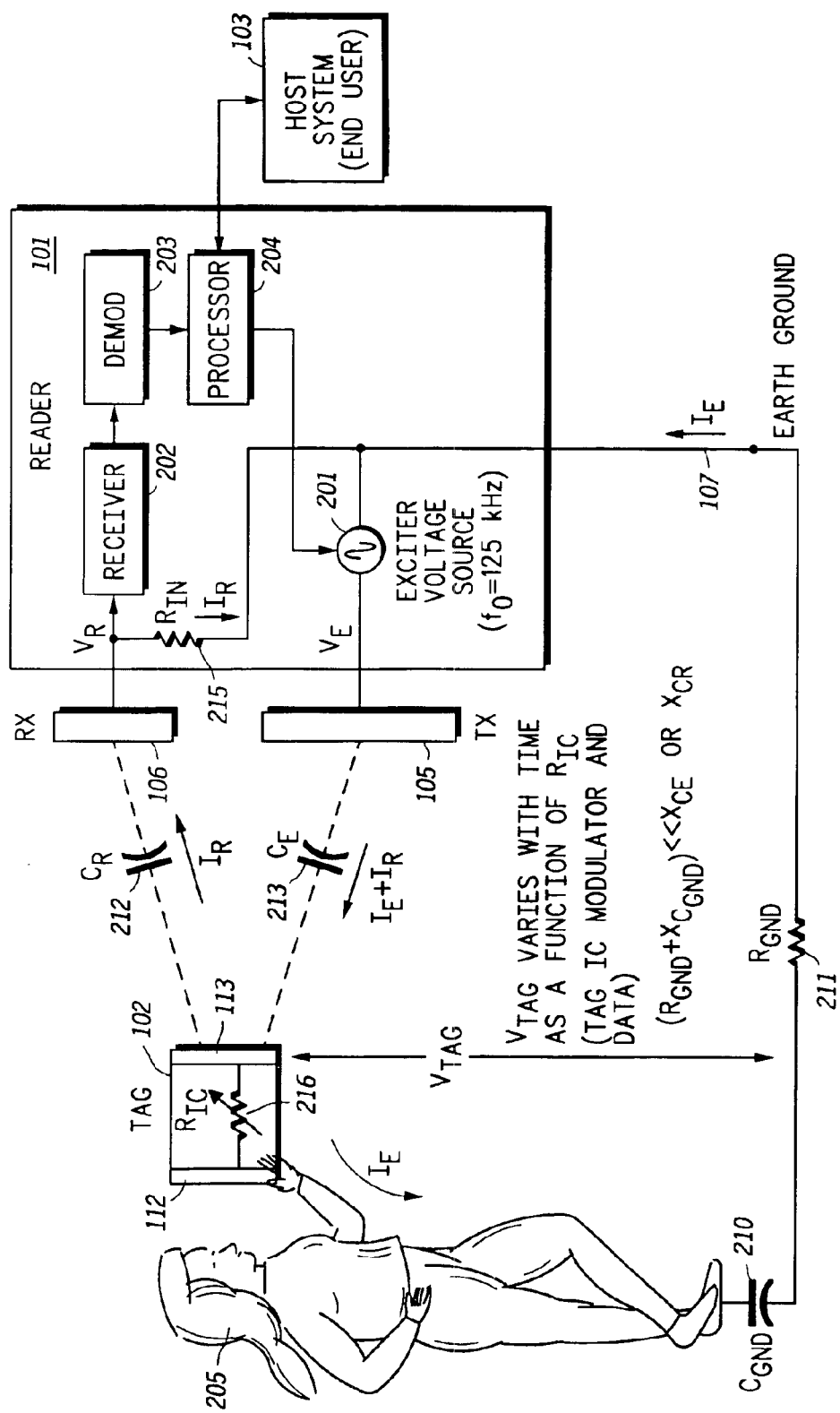
FIG. 2B is a block diagram illustrating the theory of operation of a Monopole electrostatic system.

Referring to FIG. 2A, electrostatic reader 101 is in a monopole configuration with an electrostatic electrode 107 coupled to earth ground with or without an electrostatic plate. As shown in FIG. 2A, electrostatic reader 101 comprises exciter 201, receiver 202, demodulator 203, processor 204, exciter electrostatic electrode 105, receiver electrostatic electrode 106, and the earth ground connection 107. Referring to FIG. 2B, the theory of operation of a monopole electrostatic system is now explained where the electrostatic transceiver couples to earth ground through a human body. A human body 205 couples to the transceiver 102 through the electrostatic electrode 112. The human body 205 couples to earth ground 107 through the capacitance 210 representing a shoe or other insulating materials between the human body 205 and the ground. Additionally there is a ground resistance 211 that varies as the distance of the human body 205 varies from the reader 101. Between electrostatic electrode 113 and electrostatic electrode 106 there is a return capacitance 212 and between electrostatic electrode 113 and electrostatic electrode 105 there is a excitation capacitance 213. Between the ground connection for the receiver 202 and the exciter 201 there is an input resistance 215. Between electrostatic electrode 112 and electrostatic electrode 113 there is circuitry within the transceiver 102 that causes impedance 216 to vary periodically with time. The return current path is through the impedance of the human body 205, the capacitance 210, and resistance 211 to earth ground node 107. The excitation signal generated by the exciter has an AC voltage of Ve and electrostatically couples through capacitance 213 to the transceiver 102 causing a voltage Vtag to be present between the transceiver 102 and earth ground 107. The reader 101 can communicate to the transceiver 102 by using various modulation techniques with the excitation signal generated by the exciter 201. A current, Ie, is caused to flow in the return current path. If the transceiver 102 desires to communicate information to the reader 101, it performs load modulation whereby the impedance 216 is caused to vary and a portion of the energy of the excitation signal is reflected back from electrostatic electrode 113 and through capacitance 212 to electrostatic electrode 106. As impedance 216 varies, the voltage Vtag varies accordingly. In order for the reflection of energy back to the electrostatic electrode 106 to occur effectively, the reactance of the capacitance 213 and the reactance of capacitance 212 must each be greater than the sum of the ground resistance 211, the reactance of ground capacitance 210 and the impedance of the human body. This typically occurs when the transceiver is brought within the capacitive coupling range (i.e. read range) of a reader. The reflected energy received by the reader 101 causes a voltage of Vr to be present between the input to the receiver 202 and earth ground 107. The voltage Vr causes a current to flow, ir, through the capacitance 212 and the input resistor 215. Thus, the current through the exciter and through the capacitance 213 is the sum of the currents Ie and Ir. In this manner the monopole configuration allows for bi-directional communication between the transceiver 102 and the reader 101.

In FIG. 1, the electrostatic charger 104 is in a dipole configuration having electrostatic electrode 108 and electrostatic electrode 109. In the dipole configuration neither electrostatic electrode has a preferential coupling path to earth ground. The dipole configuration lends itself to a more portable system such as a charger 104 but one could easily couple an electrode to a ground reference of some sort thereby having a portable monopole system. The impedance (real and imaginary) of the coupled electrodes can be either an AC (capacitive) or DC (resistive) path.

In general, electrostatic reader 101 generates an electrostatic (electrical) field for use both as a power source for electrostatic transceiver 102 and for transferring information between electrostatic reader 101 and electrostatic transceiver 102. As such, electrostatic reader 101 electrostatically generates and transmits an excitation signal to the surrounding air, gas, atmosphere or non-electrically conductive medium via the reader's electrostatic electrodes, except for the return path in a monopole system. The excitation signal is an AC signal which activates electrostatic transceiver 102 when it is comes within the capacitive coupling range of reader 101. Upon being sufficiently energized, electrostatic transceiver 102 may respond by electrostatically reflecting or transmitting a read data signal carrying the information stored in its memory to electrostatic reader 101 (as part of a read operation). In accordance to the present invention, reader 101 may also electrostatically couple a write signal to communicate and write information to the electrostatic transceiver 102 (as part of a write operation). Alternatively, such programming or charging can be carried out by a separate programming or encoding unit (not illustrated) or the electrostatic charger 104. It is to be appreciated that the excitation signal must be generated and transmitted by electrostatic reader 101 to charge the electrostatic transceiver 102. The excitation signal is an AC energy source and can be a continuous waveform or a varying waveform (i.e. amplitude, frequency, time, etc. of the waveform may vary). Alternatively a user could manually cause the electrostatic reader 101 or a charger 104 to generate the excitation signal to charge or communicate with the electrostatic transceiver 102 by selecting a button or switch. The reader 101 usually has available a larger power source than the electrostatic transceiver 102. Thus, the reader 101 can have very sensitive receiving circuitry and high energy transmission capability when compared with the electrostatic transceiver 102.

The read signal received by electrostatic reader 101 is demodulated, amplified, and filtered. The data carried by the read signal is decoded and formatted as required prior to being transferred to host computer system 103. Upon receiving the formatted data, host computer system 103 may use the data to update a database or perform other processing. Host computer system 103 may further processes the information received as required in certain applications. For example, in an access RFID application, host computer system 103 may compare the information received with those already stored in its database to determine whether access should be granted or denied to the individual. Alternatively, charging status information of a transceiver may be transmitted to the reader indicating that charging is complete or incomplete so that a reader can send such information to a host or perform local operations. In which case either the reader or the transceiver could have an indicator instructing a user that charging is complete or incomplete and that charging needs to occur soon at a charger or a reader that supports charging.

Referring now to FIG. 2A illustrating in greater detail the components of electrostatic reader 101 in a monopole configuration. As shown in FIG. 2A, electrostatic reader 101 comprises exciter 201, receiver 202, demodulator 203, processor 204, exciter electrostatic electrode 105, receiver electrostatic electrode 106, and the earth ground connection 107. Exciter electrostatic electrode 105 is connected to exciter 201 and receiver electrostatic electrode 106 is connected to receiver 202. In a read operation, exciter 201 generates an excitation signal for activating electrostatic transceiver 102. Basically, the excitation signal generated by the exciter 201 provides the electrostatic charges or energy to the electrostatic transceiver 102. In addition, the carrier frequency of the excitation signal may provide clock information for transceiver 102. Alternatively an internal clock may be generated by the transceiver 102. In the preferred embodiment, the excitation signal has a carrier frequency of 125 kHz. The excitation signal is transmitted to transceiver 102 through exciter electrode 105 and the ground connection 107. Additionally, exciter 201 may further generate and transmit an signal having data information by modulating data onto a carrier of the signal. The signal may carry a read or write mode data sequence including instruction, data, and address information related to a read operation or write operation for a transceiver 102 that is within the range of the reader 101. In response to a read operation, transceiver 102 communicates data, which may be memory data or other data within the electrostatic transceiver 102, to the reader 101. In response to a write operation, transceiver 102 reads data that is transmitted by the reader 101 or other source such as a programmer, decodes the data and stores it in memory within the electrostatic transceiver 102 or processes the data to perform other functions within the electrostatic transceiver 102.

When the reader 101 is receiving signals, the receiver 202 amplifies and filters out unwanted frequencies and allows desired frequencies to pass. These desired frequencies are then provided to the demodulator 203 to demodulate and to decode signals at the carrier frequency in order to detect information being transmitted by the electrostatic transceiver 102. In the preferred embodiment electrostatic transceiver 102 modulates the data onto the carrier using Binary Phase Shift Keying (BPSK), a form of Phase Shift Keying (PSK), and encodes data using NRZ encoding for communication from the transceiver 102 to the reader 101. It is to be appreciated that other modulation schemes such as Amplitude Modulation (AM), Frequency Shift Keying (FSK) modulation, and others can also be used to modulate the read data signal. Other encoding schemes, such as Manchester encoding, may be used as well. Data that is decoded is provided to the processor 204 for pre-processing and formatting for use by the host computer 103.

When the reader 101 is in a write operation for transmitting write data signals, data from host computer 103 is provided to processor 204 for reformatting into write data that may be transmitted and understood by the transceiver 102. The write data for transmission is then provided to exciter 201 which controls the generation of the excitation signal. By controlling the generation of the excitation signal, the write data may be modulated onto the carrier frequency of the excitation signal. Such modulation is performed to carry the command and control instructions (e.g., operation codes, lock bit, etc.), data, and memory address information into a write mode or read mode data sequence of an signal which allows transceiver 102 distinguish whether a write operation or read operation is desired by reader 101. As a result, the write mode data sequence includes instruction, data, and address information related to a write or functional operation. In short, exciter 202 generates and transmits a write data signal carrying a write mode data sequence at a predetermined time following the generation and transmission of the excitation signal.

A read mode data sequence can be similarly generated by the reader 101 and cause the electrostatic transceiver 102, programmed to wait for the read mode data sequence, to transmit a read signal for reception by the reader 101. Alternatively, the transceiver 102 may be programmed to automatically transmit a read signal when within the read range of a reader 101. In the preferred embodiment, Amplitude Shift Keying (ASK) modulation is performed by the reader 101 for communication to the transceiver 102 by modulating the excitation signal.

Figure 3:
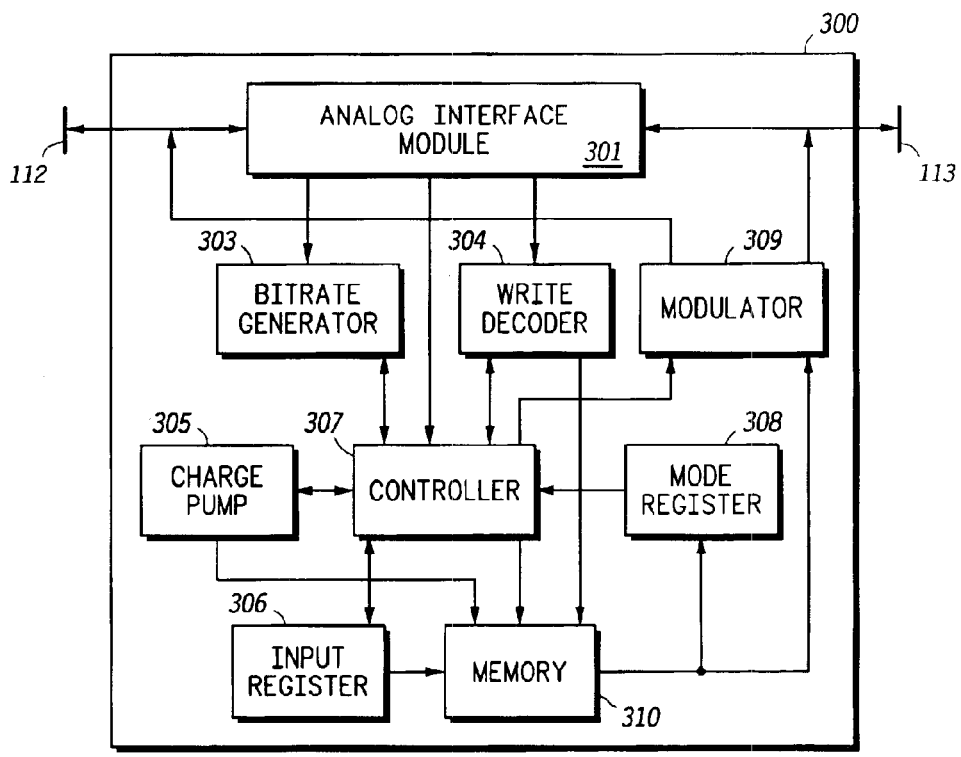
FIG. 3 is a block diagram of the electrostatic transceiver of FIG. 1.

Reference is now made to FIG. 3 illustrating in greater detail the components of transceiver 102. As shown in FIG. 3, transceiver 102 includes an integrated circuit 300 having an analog interface module 301, a bitrate generator 303, a write decoder 304, a charge pump 305, an input register 306, a controller 307, a mode register 308, a modulator 309, a memory 310, a charge receiver, and electrostatic electrodes 112 and 113. As previously discussed, electrostatic electrodes 112 and 113 receive electrostatic signals from the reader 101 or the charger 104 and couple electrostatic signals back to the reader 101 or charger 104. Electrostatic electrode 112 and electrostatic electrode 113 are connected to the analog interface module 301 and the modulator 309. In this manner signals received or communicated by the transceiver 102 pass through the analog interface module 301 or the modulator 309. For optimum electrostatic performance, it is desirable to keep the input capacitance measured between electrostatic electrodes 112 and 113 as small as possible.

Controller 307 controls the functionality of the transceiver 102 in conjunction with the analog interface module 301. Controller 307 couples to nearly all components of the electrostatic transceiver 102 except for the electrostatic electrodes and pads. Memory 310 may be a volatile memory requiring a constant supply of energy or a non-volatile memory such as an EEPROM memory that retains its information when power is no longer supplied. In the case of EEPROM memory, the charge pump 305 may be required in order to boost the power supply voltage in order to write data into the EEPROM memory. Input register 306 temporarily stores information that is to be written into memory 310. It may need to store the information due to a delay in the write cycle caused by the charge pump 305 or other reasons. In any case, storing data into the input register 306 allows the controller 307 to process other information for the transceiver 102. Mode register 308 reads configuration information for the electrostatic transceiver 102 from memory 310 and provides this to the controller 307. Write decoder 304 analyzes a data sequence being received by the electrostatic transceiver 102 and determines whether the transceiver should go into a write mode or whether it needs to remain in a receive mode or read mode. Modulator 309 prepares data read from memory 310 for transmission by the electrostatic transceiver 102. Modulator 309 encodes and load modulates the data read from memory 310.

When in proximity of a reader 101 or charger 104, the transceiver first receives the excitation signal. The excitation signal is generated by reader 101 at a carrier frequency. After receiving the capacitively coupled excitation signal, the electrostatic transceiver 102 derives a square wave at the carrier frequency, which is then used as a reference clock signal for the transceiver. In this manner of generating a clock signal, information received by the electrostatic transceiver 102 is synchronized with the clock signal. This alleviates generating a clock with a clock oscillator and synchronizing the data and clock using phase-locked loop techniques, although an internal oscillator could be employed if desired.

The analog interface module 301 performs multiple functions when receiving and communicating electrostatic signals and charges in an analog signal form. The analog interface module 301 generally performs the electrostatic communication and power supply management functions for the electrostatic transceiver 102. Additionally, it performs clock extraction in order to provide a clock to other components of the electrostatic transceiver 102 including the bitrate generator 303 such that the clock is synchronized with received data. The analog interface module 301 also demodulates a received signal to generate a received data stream. A gap detector (not shown) within the analog interface module 301 analyzes the data stream and determines if a write operation may be involved. If so, it forwards the data sequence signal to the write decoder 304. Write decoder 304 then decodes the data sequence signal to retrieve instruction, data, and address information related to the write operation. If it recognizes the codes as a write command, write decoder 304 signals to so notify controller 307. Write decoder 304 also verifies the validity of the data stream. The decoded instructions and information about the validity of the data stream are provided to controller 307.

Bitrate generator 303 receives as input the clock signal which was extracted by the clock extraction circuit (not shown). The clock signal preferably has a carrier frequency of 125 kHz. Bitrate generator 303 generates the data transfer rate at which data is transferred from/to memory 310 during a read or write mode, respectively. Bitrate generator 303 generates the data transfer rate by dividing the carrier frequency by a predetermined factor. The data transfer rate is provided to controller 307. In the preferred embodiment, bitrate generator 303 can be programmed to operate at either one-eighth, one-sixteenth or one-thirty-second of the carrier frequency.

Figure 4:
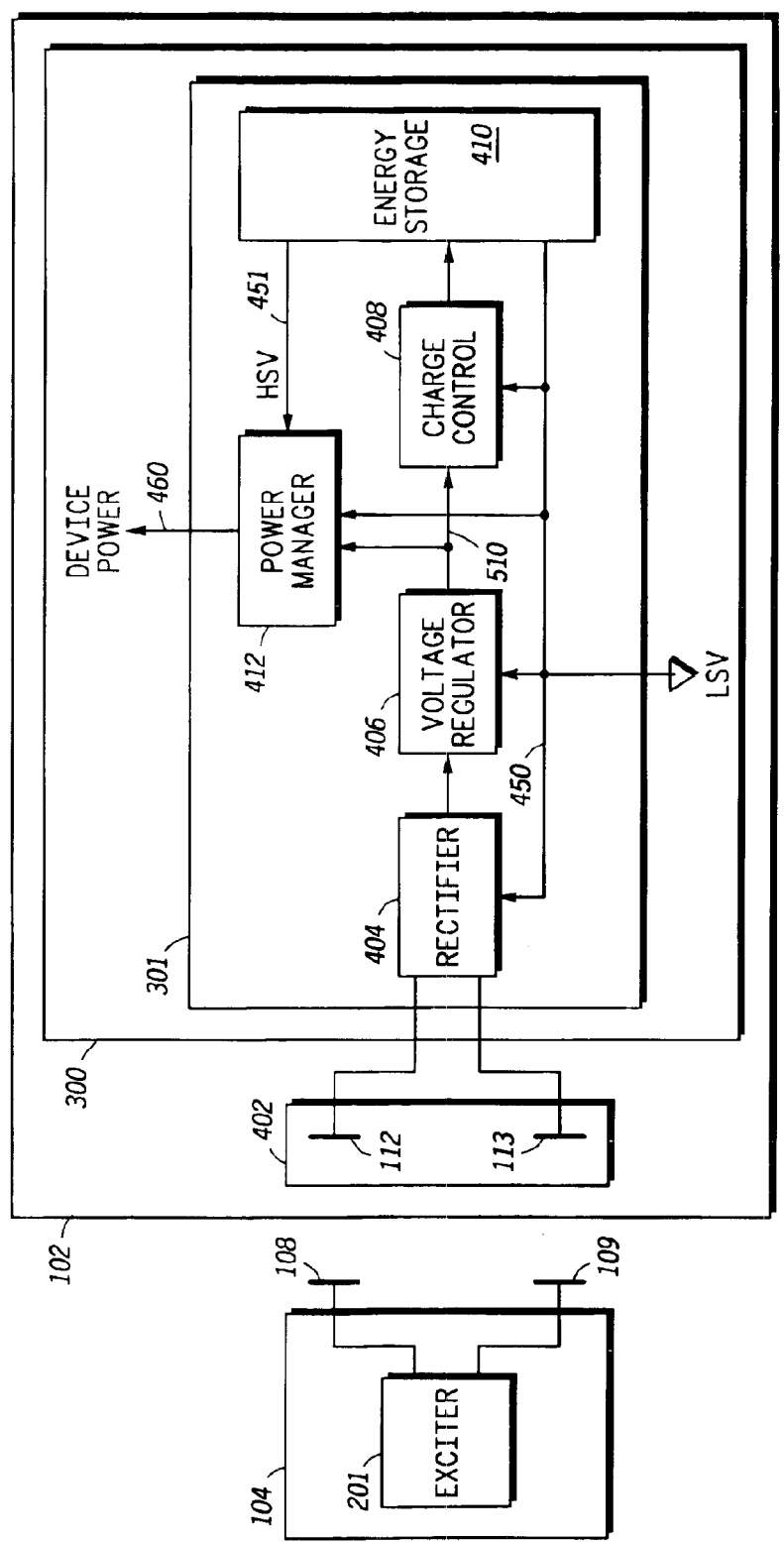
FIG. 4 is a block diagram the charging circuitry of a first embodiment for the electrostatic transceiver of FIG. 3.

FIG. 4 illustrates a simplified block diagram of the electrostatic charging system including the electrostatic charger 104 and the electrostatic transceiver 102. FIG. 4 emphasizes a charge receiver 402 and portions of the analog interface module 301 of the electrostatic transceiver 102. The charging circuitry of the analog interface module 301 includes a rectifier 404, a voltage regulator 406, a charge controller 408, an energy storage means 410, and a power manager 412. The energy storage means 410 can be a rechargeable battery, a capacitor, or some other type of energy storing component. Preferably the energy storage means 410 is a thin battery for use in a smart card or RFID transceiver that is inexpensive and may have a relatively low storage capacity. The rectifier 404 receives an AC signal having an AC voltage from the charge receiver 402 and rectifies it into a DC signal. Voltage regulator 406 receives the DC signal from the rectifier 404 and limits it to a DC voltage range. The voltage regulator is designed so that the range of DC voltage generated is sufficiently great enough to charge the energy storage means 410. Charge controller 408 receives the DC voltage from the voltage regulator 406 and controls the charging of the energy storage means 410. The charge controller 408 may simply cause charging to occur when there is sufficient voltage from the voltage regulator and avoid the discharge of the energy storage means 410 when there is insufficient voltage being received from the voltage regulator 406. Charge controller 408 may have more complex control mechanisms such as monitoring the charge condition of the energy storage means and making a determination whether or not to charge based on the charge condition. Charge controller 408 may also regulate the amount of current flow into the energy storage means 410 and prevent the reverse flow of current back into the voltage regulator 406 when receiving insufficient voltage levels for charging thereby preventing degradation of the energy storage means 410. Energy storage means 410 supplies a low level supply voltage ("LSV") 450 to other circuitry within the analog interface module 301 and the electrostatic transceiver 102. Energy storage means 410 may supply the high level supply voltage ("HSV") 451 to a power manager 412 or the components within the electrostatic transceiver 102. Power manager 412 may perform a power on reset function for the remaining components of the electrostatic transceiver 102. Additionally it may perform energy conservation functionality by only powering certain parts of the electrostatic transceiver 102 at appropriate moments. Also, it may select between power sources. For example, in one case it may select the energy storage means 410 when sufficiently charged and in another case it may select the output from the voltage regulator, bypassing the energy storage means 410 when insufficiently charged or when its no longer usable, when the transceiver 102 is in an excitation field. Additionally, the power manager 412 may delay the power up of components of the electrostatic transceiver 102 until the energy storage means 410 is sufficiently charged or sufficient power is otherwise available. In any case, the power manager 412 may supply power to other circuitry of the transceiver 102 over the device power line 460.

Figure 5A:
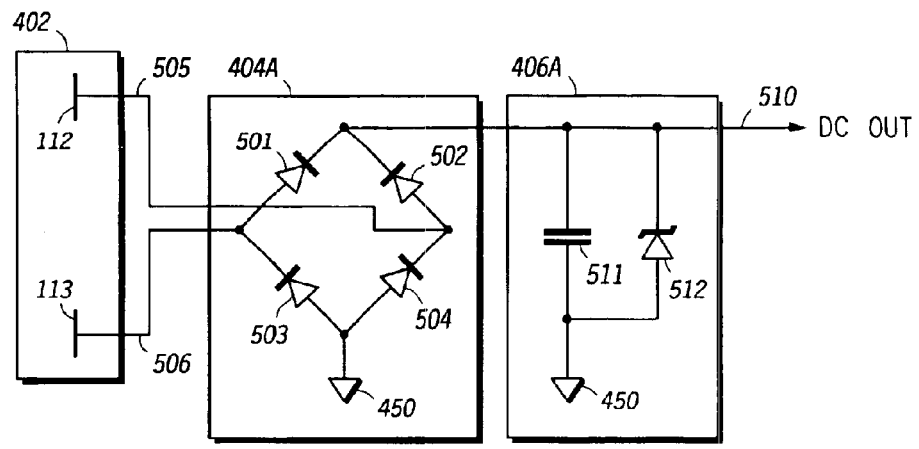
FIG. 5A is a circuit schematic of exemplary components of the electrostatic charge receiver, rectifier, and voltage regulator blocks of FIG. 4.
Figure 5B:
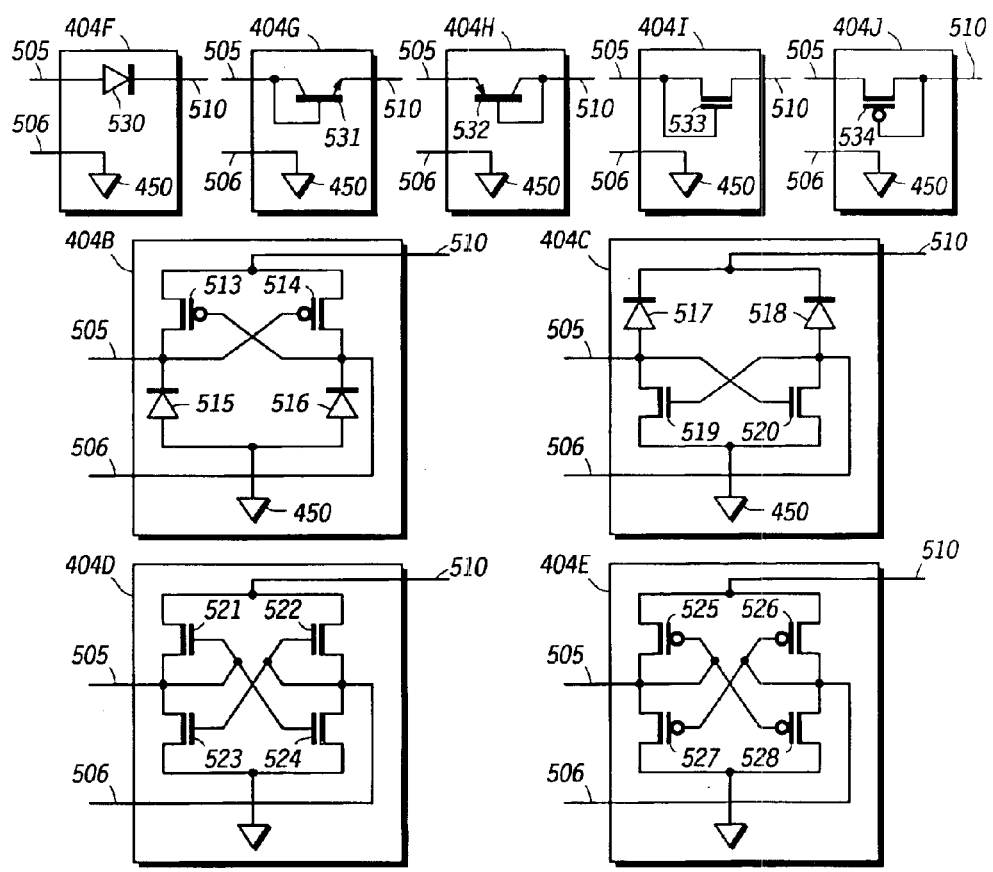
FIG. 5B is a circuit schematic of alternate components for the rectifier block of FIG. 4.
Figure 5C:
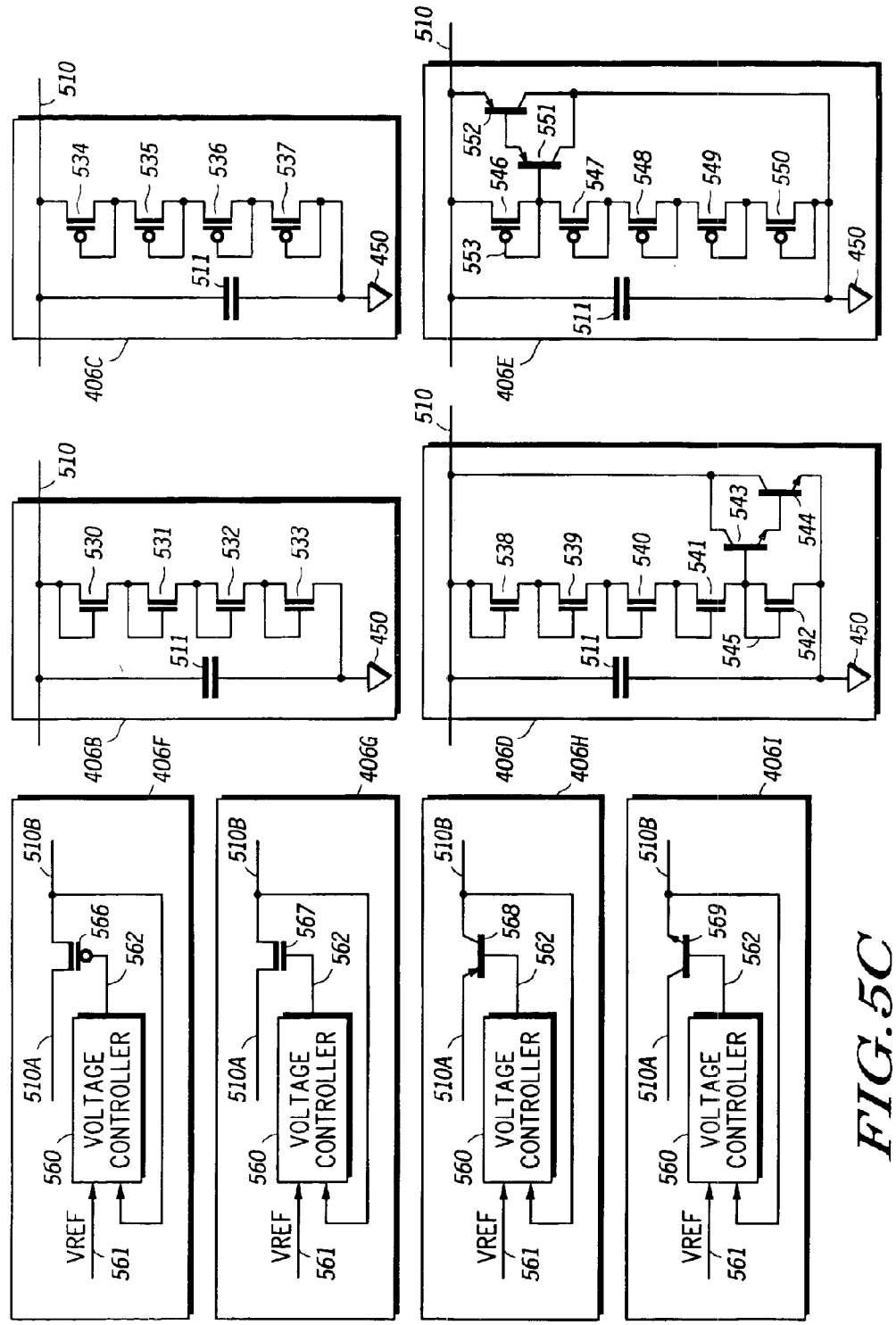
FIG. 5C is a circuit schematic of alternate components for the voltage regulator of FIG. 4.

FIG. 5A is a schematic diagram of exemplary circuitry for the charge receiver 402, the rectifier 404A, and the voltage regulator 406A. The exemplary charge receiver 402 includes two electrostatic electrodes 112 and 113 which also function as antenna for transceiving information to or from the electrostatic reader 101. The two electrostatic electrodes have sufficient area in order to receive a charge from an electrostatic charger 104 or an electrostatic reader 101. Electrostatic electrode 112 is connected to node 505 and electrostatic electrode 113 is connected to node 506. The exemplary rectifier 404A is a full-wave bridge rectifier and includes diodes 501–504 in a configuration such that the AC voltage at nodes 505 and 506 is converted into a DC supply voltage having a full-wave rectified waveform at node 510 with respect to node 450. Diodes 503 and 564 have their anodes connected to LSV 450. The cathode of diode 503 and anode of diode 501 are connected to node 506. The cathode of diode 504 and the anode of diode 502 are connected to node 505. The cathodes of diodes 501 and 502 are connected to node 510. In FIG. 5B, alternate full-wave rectifiers 404B–404E are illustrated. Half-synchronous full-wave bridge rectifier 404B includes PFET transistors 513 and 514 and diodes 515 and 516. Half-synchronous full-wave bridge rectifier 404C includes diodes 517 and 518 and NFET transistors 519 and 520. Synchronous full-wave bridge rectifier 404D includes NFET transistors 521–524. Synchronous full-wave bridge rectifier 404E includes PFET transistors 525–528. A simpler half-wave rectifier may be used as illustrated in FIG. 5B by rectifiers 404F–404J but may be less efficient in rectification than that of the full-wave rectifiers. Half-wave rectifier 404F includes the diode 530. Half-wave rectifier 404G includes an NPN bipolar transistor 531 with its base tied to its collector while half-wave rectifier 404H includes a PNP bipolar transistor 532 with its base tied to its collector. Half-wave rectifier 404I includes an NFET with its gate coupled to its drain and input 505 of the rectifier with its source coupled to the output 510 of the rectifier. Half-wave rectifier 404J includes a PFET with its gate coupled to its drain and output 510 of the rectifier with its source coupled to the input 505 of the rectifier. The exemplary voltage regulator 406A is a shunt voltage regulator and includes capacitor 511 and zener diode 512 for filtering out any AC components. Capacitor 511 may be selected to be sufficiently large enough to reduce ripple in the DC voltage on node 510. One end of capacitor 511 is connected to node 510 and the other end is connected to the LSV 450. Zener diode 512 is selected such that, when operating in its reverse biased mode, it sufficiently limits the maximum voltage on node 510. The cathode of zener diode 512 is connected to node 510 and its anode is connected to LSV 450. The voltage regulator 406 may use other common components, such as a transistor, in order to integrate the circuitry of the active device into one integrated circuit chip. Alternate shunt voltage regulators 406B–406E as illustrated in FIG. 5C may be used for voltage regulation. Shunt voltage regulator 406B includes the capacitor 511 and NFET transistors 530–533 all coupled in series and having their gates coupled in a diode configuration (gate coupled to the drain). Shunt voltage regulator 406C includes the capacitor 511 and PFET transistors 534–537 all coupled in series and having their gates coupled in a diode configuration (gate coupled to the drain). Shunt voltage regulator 406D includes the capacitor 511 and NFET transistors 538–542 coupled in series and in a diode configuration and NPN bipolar transistors 543 and 544 connected in a Darlington configuration as illustrated. Shunt voltage regulator 406E includes the capacitor 511 and PFET transistors 546–550 coupled in series and in a diode configuration and PNP bipolar transistors 551 and 552 connected in a Darlington configuration as illustrated. Either field effect transistor (FET) type, NFETS or PFETS, in the series path within the shunt voltage regulators may be added or subtracted in order to increase or decrease the voltage limitation of the regulator. Additionally the Darlington pairs of PNP 551–552 and NPN 543–544 may be a single bipolar transistor or multiple bipolar transistor each in a Darlington configuration.

As an alternative to shunt voltage regulators, series-pass voltage regulators 406F–406I as illustrated in FIG. 5C may be used for voltage regulation. In regulators 406F–406I, the node 510 is split in two into nodes 510A and 510B in order to insert the transistors 566–569 between 510A and 510B. Nodes 510 and 510B may also be referred to as a DC supply node. In regulator 406F, PFET 566 has its source coupled to node 510A, its drain coupled to node 510B, and its gate coupled to the output 562 of the voltage controller 560. The voltage controller 560 is an error amplifier and properly generates a signal on output 562 to control the transistors 566–569. Voltage controller 560 compares a voltage reference input 561 and a feedback voltage from node 510B in order to properly regulate the voltage at node 510B. In regulator 406G, NFET 567 has its drain coupled to node 510A, its source coupled to node 510B, and its gate coupled to the output 562 of the voltage controller 560. In regulator 406H, PNP transistor 568 has its emitter coupled to node 510A, its collector coupled to node 510B, and its base coupled to the output 562 of the voltage controller 560. In regulator 406I, NPN transistor 569 has its collector coupled to node 510A, its emitter coupled to node 510B, and its base coupled to the output 562 of the voltage controller 560. Regulators 406F–406I operate similarly in that they control the conduction of transistors 566–569, and therefore the voltage dropped across nodes 510A and 510B, such that the voltage at node 510B is regulated to the desired value.

Figure 5D:
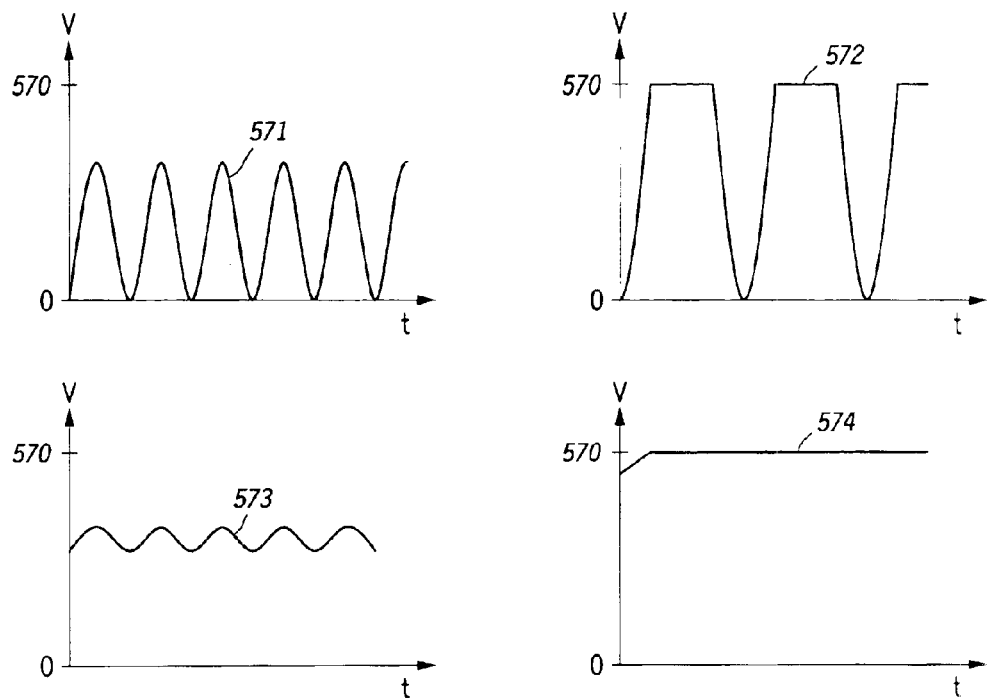
FIG. 5D is an exemplary waveform diagram illustrating the functionality of components of the rectifier and voltage regulator.

FIG. 5D illustrates exemplary waveforms showing the functionality of the rectifier and voltage regulator components. In each plot voltage is plotted against time. The voltage regulation is set to the maximum voltage level VREG 570. Waveforms 571–574 depict the voltage on node 510 versus time. Waveforms 571–574 have a single polarity due to the rectification provided by the rectifier. Waveforms 571 and 572 are illustrations of the voltage on node 510 versus time with the capacitor 511 eliminated from the voltage regulator. Waveforms 573–574 are illustrations of the voltage on node 510 versus time with the capacitor 511. As illustrated, capacitor 511 reduces the ripple voltage in the waveform. Waveforms 571 and 573 depict receiving electrostatic signals that are insufficient to cause the voltage regulator to limit the voltage level to VREG 570. Waveforms 572 and 573 depict receiving electrostatic signals that cause the voltage regulator to limit the voltage level to VREG 570.

Figure 6A:
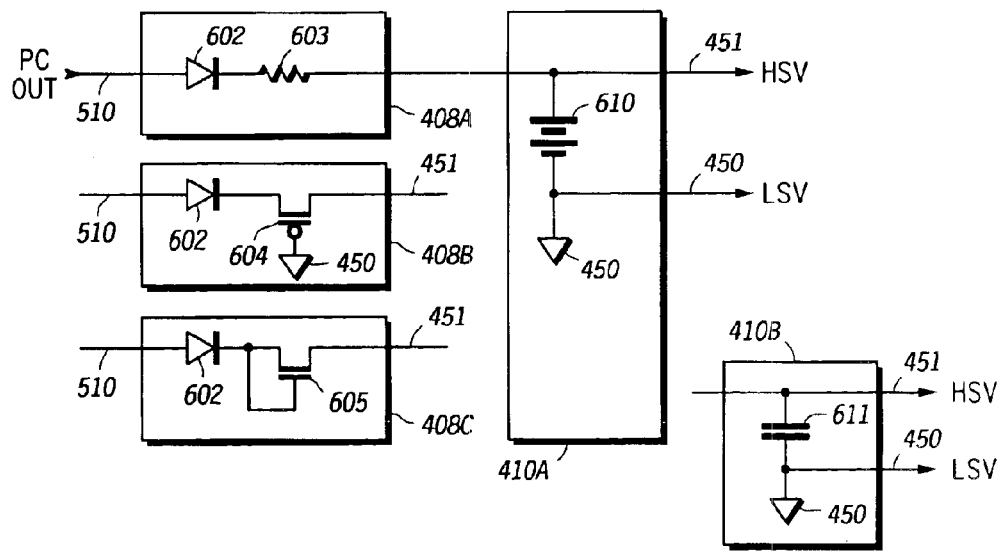
FIG. 6A is a circuit schematic of exemplary components for the charge controller and energy storage blocks of FIG. 4.
Figure 6B:
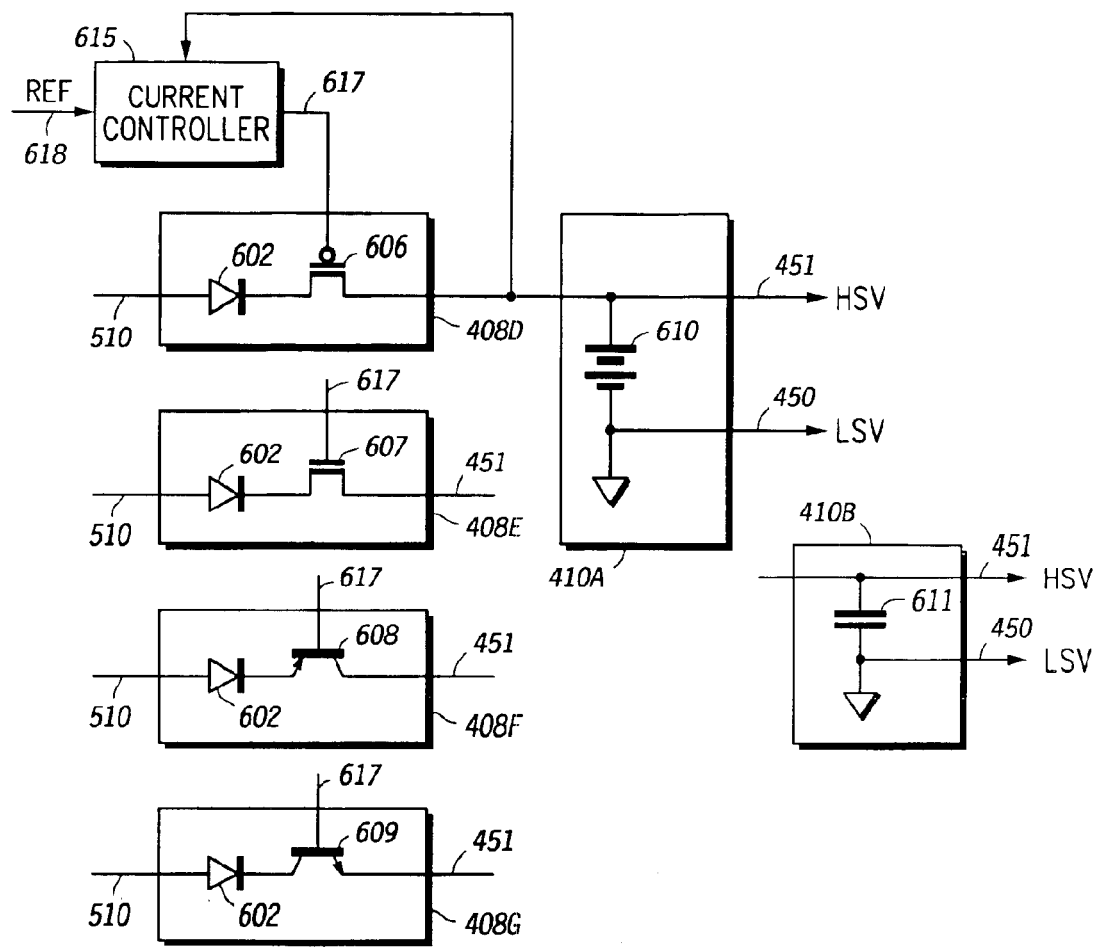
FIG. 6B is a circuit schematic of alternate exemplary components for the charge controller and energy storage blocks of FIG. 4.

FIG. 6A is a schematic diagram of exemplary circuitry for the charge controller 408 and the energy storage means 410. The exemplary charge controller 408A is a non-controllable type charge controller and includes a diode 602 and a resistor 603. The anode of diode 602 is connected to node 510. The cathode of diode 602 is connected to a first end of resistor 603. Resistor 603 has a second end connected to HSV 451. In this exemplary charge controller 408A, the diode 602 prevents the reverse flow of current from the energy storage means 410 and requires that the voltage generated by the voltage regulator be greater than the voltage of the energy storage means by at least the turn on threshold of the diode 602. Resistor 603 is appropriately selected in accordance with the characteristics of the energy storage means so that excessive current is not provided to the energy storage means during charging. Alternate non-controllable type charge controllers 408B and 408C are illustrated in FIG. 6A and operate similar to charge controller 408A. Charge controller 408B includes the diode 602 and a PFET transistor 604 in a resistor configuration with its gate tied to the low level voltage supply 450. Charge controller 408C includes the diode 602 and an NFET transistor 605 in a resistor configuration with its gate tied to a high voltage source, in this case its own drain. Also the charge controller 408 may be a variable type charge controller 408D–408G as illustrated in FIG. 6B with a variable control means such as current controller 615. A variable type charge controller may be used to control the charge rate, reduce battery memory phenomena of rechargeable batteries, or perform other charge control functions. Generally, the charge control is tailored to the characteristics of the energy storage means and limits the maximum current flow including completely shutting off current flow to the battery. Current controller 615 is an error amplifier that compares a reference input 618 with the feedback received from the high level supply voltage 451. Depending upon the amount of error the resistance of transistors 606–609 are varied by the proper control signal generated on output 617 from the current controller 615. Referring to FIG. 6B, the variable charge controller 408D includes the current controller 615, a diode 602 and a PFET transistor 606 with its gate tied to a variable voltage source 617 received from the current controller 615. Variable charge controller 408E includes the current controller 615, the diode 602 and an NFET transistor 607 with its gate tied to a variable voltage source 617 received from the current controller 615. Variable charge controller 408F includes the current controller 615, the diode 602 and a PNP bipolar transistor 607 with its base tied to a variable current source 617 received from the current controller 615. Variable charge controller 408G includes the current controller 615, the diode 602 and an NPN bipolar transistor 609 with its base tied to a variable current source 617 received from the current controller 615. While diode 602 has been described as being consistent with the charge controllers 408D–408G, diode 602 is not always necessary and may be eliminated in some cases. The exemplary energy storage means 410A is a rechargeable battery 610. The positive terminal of the rechargeable battery 610 is connected to HSV 451. The negative terminal of the rechargeable battery 610 is connected to LSV 450. In the case of smart cards or RFID transceivers, the rechargeable battery preferably is a thin rechargeable battery and may have a nominal voltage of around 3 volts between LSV 450 and HSV 451 in order to provide power to an integrated circuit chip. Alternatively, the energy storage means 410B includes a capacitor 611 for holding charge. Referring to FIG. 4, power manager 412 can receive the HSV 451 provided by the energy storage means 410 and appropriately power the remaining components within the electrostatic transceiver 102 over the device power line 460 in a manner consistent with the desired design of power control and management within the electrostatic transceiver 102.

Figure 7:
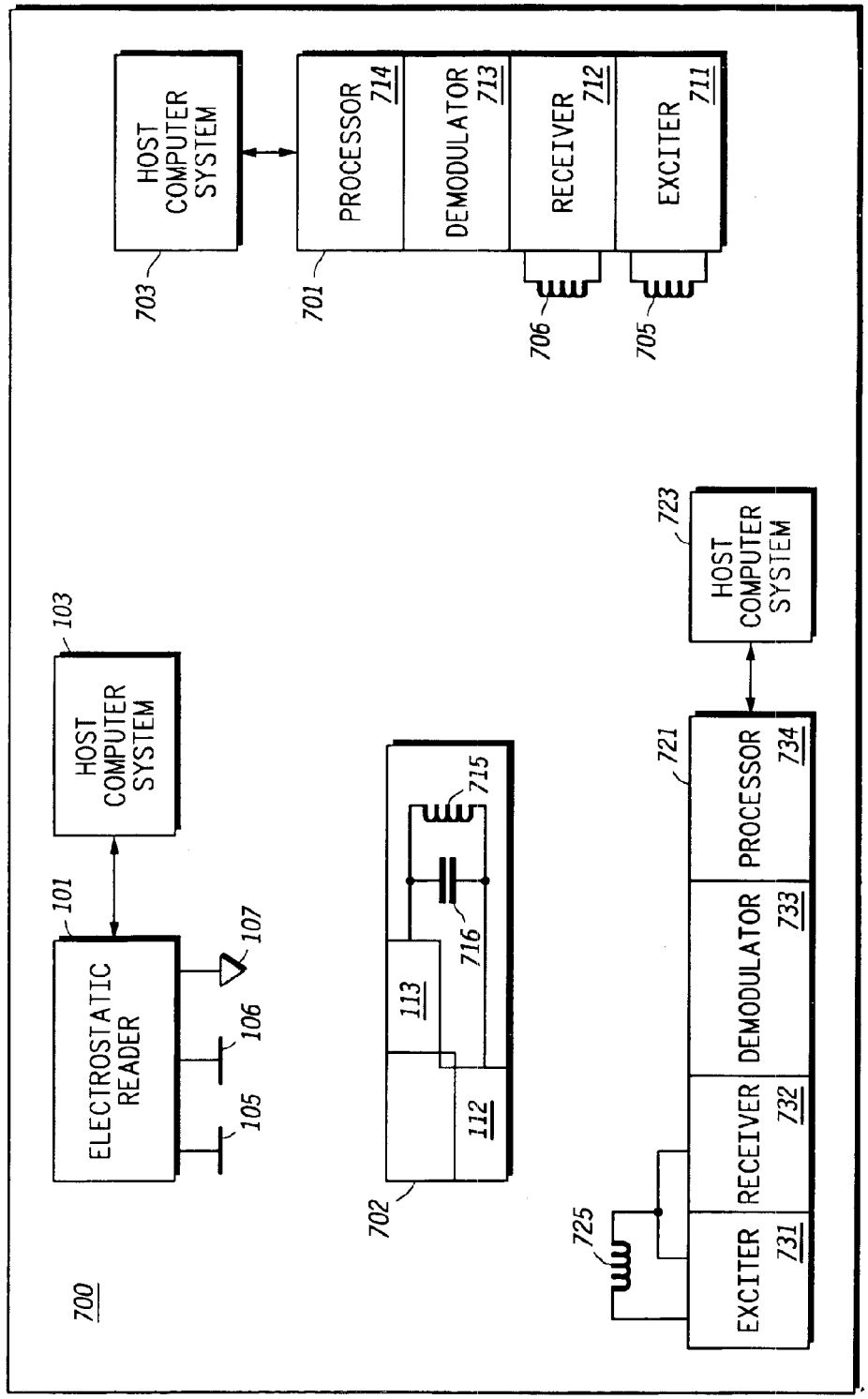
FIG. 7 is a system level diagram illustrating the mixed electrostatic and electromagnetic system of the present invention.

FIG. 7 illustrates a second embodiment of the present invention of an electrostatic and electromagnetic charging system 700 which can simultaneously charge the energy storage means and communicate information by means of inductive coupling or capacitive coupling. The electrostatic and electromagnetic charging system 700 may include the electrostatic reader 101, host computer system 103, electromagnetic reader 701, electromagnetic reader 721, a host computer system 703, and an electrostatic/electromagnetic transceiver 702. While both electromagnetic reader 701 and electromagnetic reader 721 are illustrated in FIG. 7 both are not required in system 700. Electromagnetic reader 701 illustrates a reader having separate coils for receiving and transmitting while electromagnetic reader 721 illustrates a lower cost reader having a single coil for receiving and transmitting electromagnetic signals. The electromagnetic reader 701 and electromagnetic reader 721 are similar in functionality to the electrostatic reader 101 however they couple to active devices such as electrostatic/electromagnetic transceiver 702 by means of electromagnetic coupling. In order to couple electromagnetically, electromagnetic reader 701 uses a first electromagnetic coil 705 and a second electromagnetic coil 706 to respectively transmit or receive an electromagnetic signal by means of an AC electromagnetic field. Electromagnetic reader 721 uses an electromagnetic coil 725 to respectively transmit or receive an electromagnetic signal by means of electromagnetic radio waves. Electromagnetic reader 701 includes an exciter 711, a receiver 712, a demodulator 713, and processor 714. Processor 714 of the electromagnetic reader 701 includes a host interface for communicating with the host computer system 703. Electromagnetic reader 721 includes an exciter 731, a receiver 732, a demodulator 733, and processor 734. Processor 734 of the electromagnetic reader 721 includes a host interface for communicating with the host computer system 723. The electromagnetic reader 701 and electromagnetic reader 721 operate functionally similar to the electrostatic reader 101 described above. While the exciter in the electrostatic reader 101 generates a first excitation signal, the exciter 711 generates a second excitation signal for transmission as an electromagnetic radio wave to excite and charge the electrostatic/electromagnetic transceiver 702. Electrostatic/electromagnetic transceiver 702 includes coil 715 and capacitor 716, a parallel resonant circuit, in order to electromagnetically couple to the coils 705 and 706 of the electromagnetic reader 701. Electrostatic/electromagnetic transceiver 702 includes electrostatic electrode 112 and 113 for interfacing and capacitively coupling to the electrostatic reader 101. Electrostatic/electromagnetic transceiver 702 operates functionally similar to the electrostatic transceiver 102 described above.

Figure 8A:
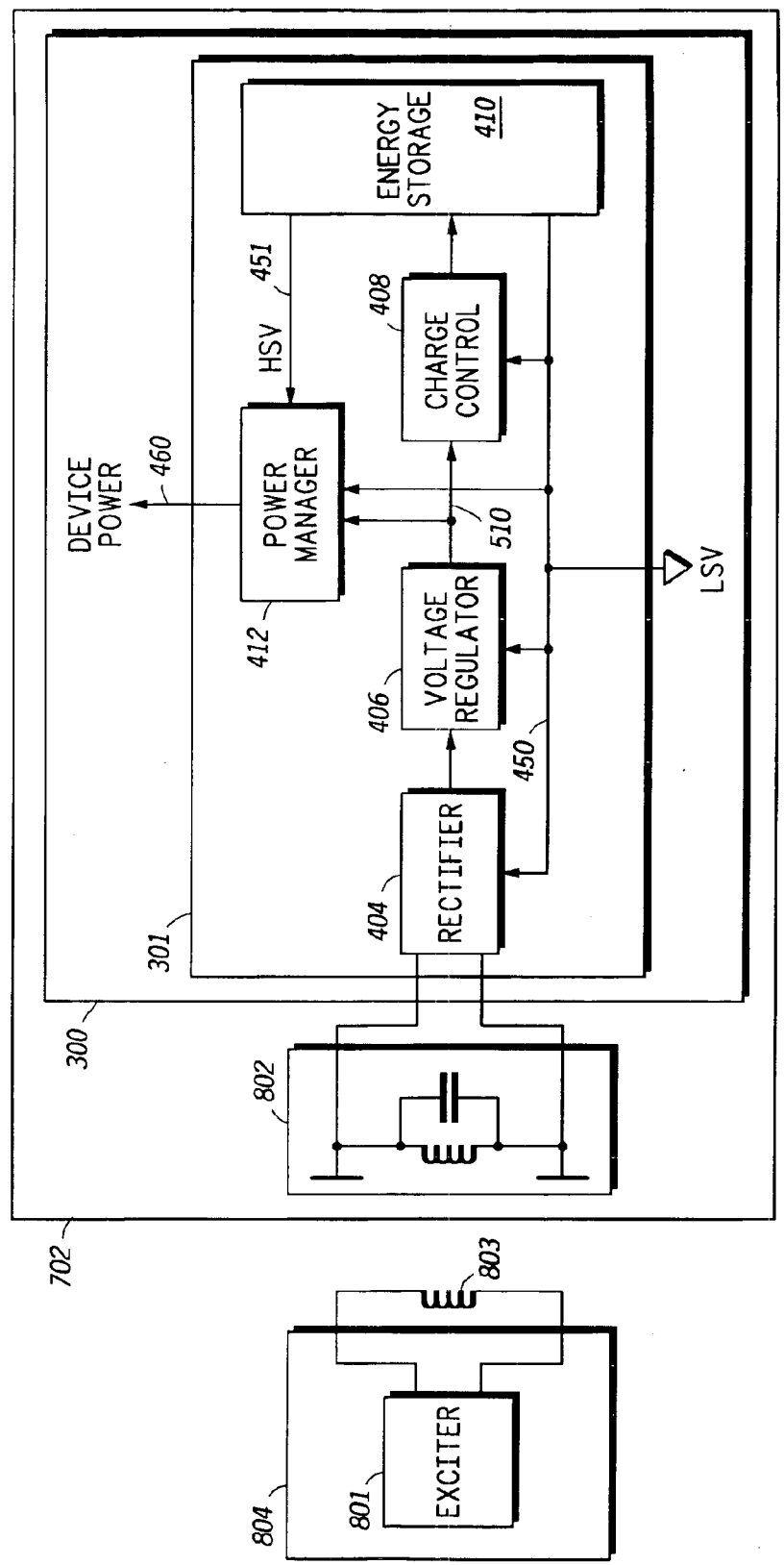
FIG. 8A is a block diagram of the charging circuitry of a second embodiment of the present invention.

FIG. 8A illustrates a block diagram of the second embodiment of the electrostatic charging system including the electrostatic/electromagnetic transceiver 702 and an electromagnetic charger 804. FIG. 8A emphasizes a charge receiver 802 and portions of the analog interface module 301 of the electrostatic/electromagnetic transceiver 702. The charging circuitry of the analog interface module 301 includes functionally similar circuits as described above including the rectifier 404, a voltage regulator 406, a charge controller 408, an energy storage means 410, and a power manager 412. The description and functionality of the components of electrostatic/electromagnetic transceiver 702 are similar to those components of electrostatic transceiver 102 having the same reference designators, except that, rectifier 404 rectifies an AC voltage received from the charge receiver 802 instead of charge receiver 402. The AC voltage received is rectified into a DC signal by the rectifier 404 and supplied to the voltage regulator 406. Electromagnetic charger 804 includes exciter 801 and coil 803. Exciter 801 operates similar to exciter 201 and exciter 711. Exciter 801 and exciter 711 are designed for driving coils 803 and 705 respectively.

Figure 8B:
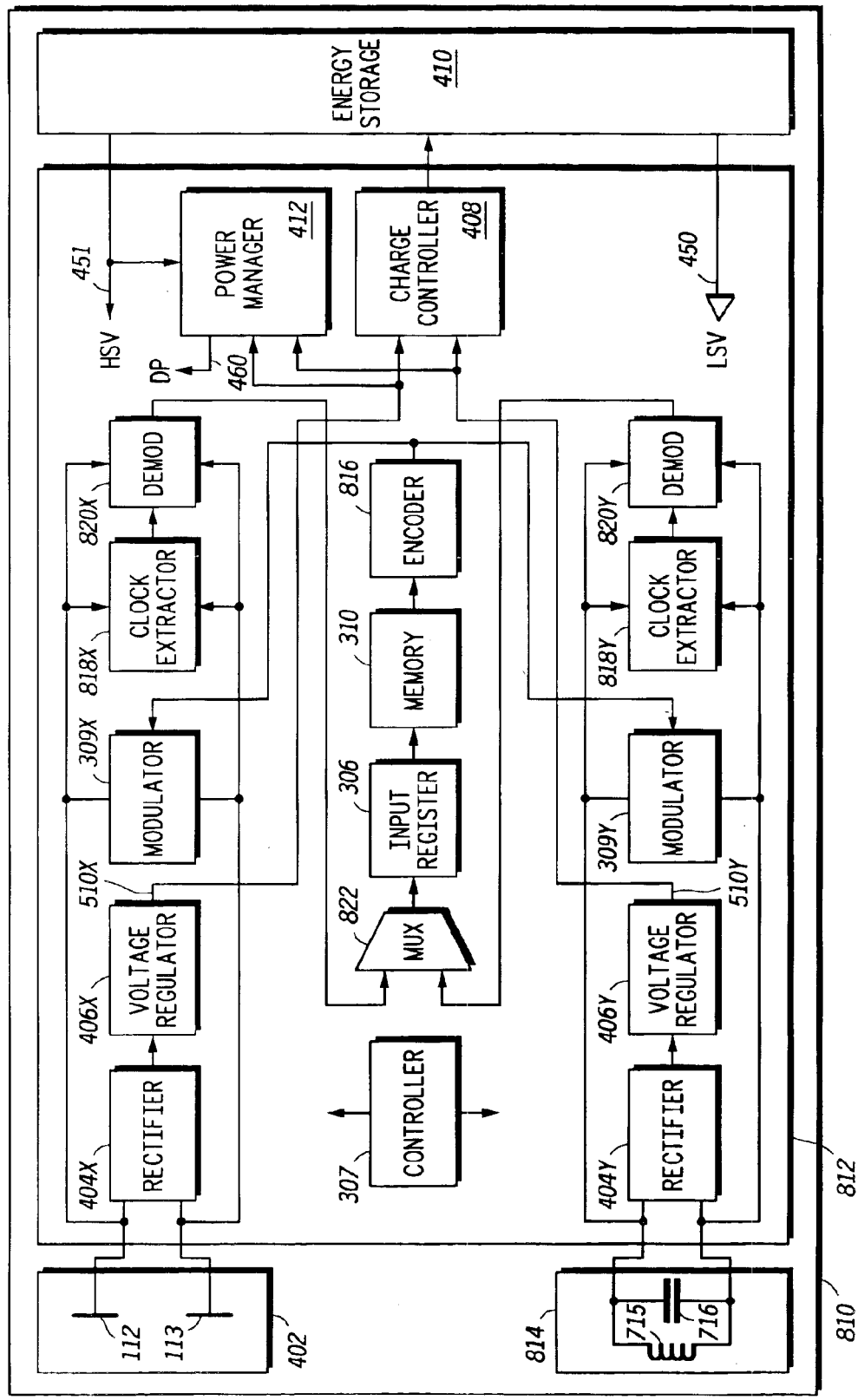
FIG. 8B is a block diagram of an alternate electrostatic/electromagnetic transceiver for the second embodiment of the present invention.

FIG. 8B is a block diagram of an alternate electrostatic/electromagnetic transceiver 810 for the second embodiment of the present invention. The electrostatic/electromagnetic transceiver 810 includes a transceiver circuit 812, an electromagnetic charge receiver 814, the electrostatic charge receiver 402, and the energy storage means 410. Like numbered components previously described function similarly in the ES/EM transceiver 810. Electromagnetic charge receiver 814 includes the parallel resonant circuit of the coil 715 and the capacitor 716. The electrostatic/electromagnetic transceiver 810 is optimized by keeping the electromagnetic and electrostatic circuitry separated but combined in the transceiver 810 so that any adverse affects that might otherwise occur if the circuitry were combined is reduced. In transceiver circuit 812, certain circuitry is duplicated in order to interface to the electrostatic charge receiver 402 and the electromagnetic charge receiver 814. Rectifier 404 is duplicated as rectifier 404X and rectifier 404Y. Voltage regulator 406 is duplicated as voltage regulator 406X and voltage regulator 406Y. While dual voltage regulators may be employed as illustrated, it is preferable to use a single voltage regulator 406 in order to conserve circuitry. In this case, the outputs of the rectifier 404X and rectifier 404Y are summed together and provided to a single voltage regulator 406. Load modulator 309 is duplicated as load modulator 309X and load modulator 309Y. A clock extractor within the analog interface module is duplicated as clock extractor 818X and clock extractor 818Y. A demodulator within the analog interface module is duplicated as demodulator 820X and 820Y. Other circuitry of the transceiver circuit 812 is shared by the circuitry dedicated to supporting either electrostatic signals or electromagnetic signals. Signals to the shared circuitry from either block may be multiplexed such as by multiplexer 822 or summed together such as may be performed by charge controller 408. Alternatively, charge controller 408 may select the preferred source of energy from either the regulator 406X or the regulator 406Y available respectively from nodes 510X and 510Y. Similarly power manager may now select power from three sources, the regulator 406X, the regulator 406Y, or the energy storage means 410. In order to communicate signals to either an electrostatic reader or an electromagnetic reader, transceiver circuit 812 includes a data encoder 816, a modulator 309X for communicating through the electrostatic electrodes 112 and 113, and a modulator 309Y for communicating through the electromagnetic coil 715. To receive electrostatic signals, transceiver circuit 812 includes a clock extractor 818X and a demodulator 820X. To receive electromagnetic signals, transceiver circuit 812 includes a clock extractor 818Y and a demodulator 820Y. Alternatively a single demodulator may be used that is clocked by clock extractor 818X and clock extractor 818Y to decode electrostatic and electromagnetic signals respectively. Received data signals from the demodulators can be multiplexed by multiplexer 822 for storage into memory 310 or they may be multiplexed into other circuitry. Controller 307 controls the interfacing to the two signal types.

Figure 9:
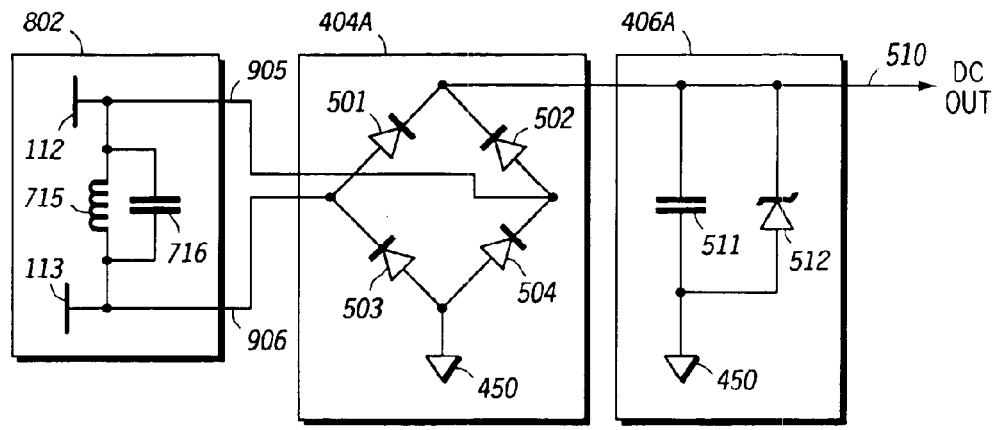
FIG. 9 is a circuit schematic of exemplary components for the electromagnetic charge receiver, rectifier and energy storage blocks of FIG. 8A.

FIG. 9 is a schematic diagram of exemplary circuitry for the charge receiver 802, the rectifier 404, and the voltage regulator 406. Rectifier 404 and voltage regulator 406 function similarly as described above. The exemplary charge receiver 802 includes an electrostatic charge receiver and an electromagnetic charge receiver. The exemplary electrostatic charge receiver consists of two electrostatic electrodes 112 and 113, which may also act as antenna for transceiving information to or from the electrostatic reader 101 or an electrostatic programmer. The exemplary electromagnetic charge receiver consists of coil 715 and resonant capacitor 716. The electrostatic electrodes 112 and 113 are preferably of higher conductivity to avoid interference with the electromagnetic coil 715. To improve the communication of signals from the transceiver 702, the modulator 309 may be coupled to an additional coil and resonant capacitor (not shown) instead of coil 715 and capacitor 716 for transmission of electromagnetic signals. In the charge receiver 802, electrostatic electrode 112 is connected to node 905, electrostatic electrode 113 is connected to node 906, and coil 715 has one end connected to node 905 and an opposite end connected to node 906. Exemplary rectifier 404 couples to an electrostatic/electromagnetic charge receiver 802 instead of an electrostatic charge receiver 402. Diodes 501–504 are connected in a bridge rectifier configuration such that the AC voltage at nodes 905 and 906 is converted into an oscillating variable DC supply voltage at node 510. Diodes 503 and 504 have their anodes connected to LSV 450. The cathode of diode 503 and anode of diode 501 are connected to node 906. The cathode of diode 504 and the anode of diode 502 are connected to node 905. The cathodes of diodes 501 and 502 are connected to node 510. The exemplary voltage regulator 406 is similarly configured and functions as previously described above.

Figure 10:
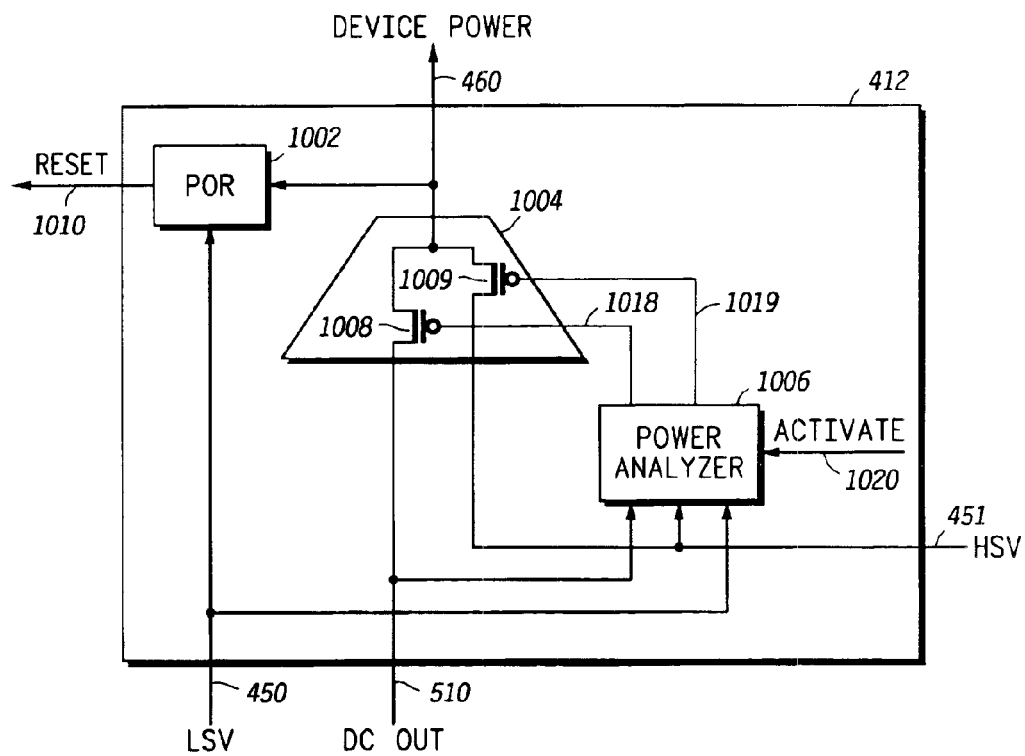
FIG. 10 is a block diagram of the power manager of FIG. 4 and FIG. 8A.

FIG. 10 is a block diagram of the power manager 412 of FIG. 4 and FIG. 7. The power manager 412 includes a power on reset (POR) circuit 1002, a multiplexer 1004 and a power analyzer 1006. The POR circuit 1002 is coupled to the device power line 460 and causes a signal on line 1010 to enable other circuitry when the transceiver 102 or 702 has sufficient power supply voltage for proper operation. The multiplexer 1004 multiplexes the DC supply voltage on node 510 and the high level supply voltage 451 out onto the device power line 460. The multiplexer 1004 can simply consist of a pair of switching transistors 1008 and 1009, preferably P type Metal Oxide Semiconductor Field Effect Transistors with their drains connected together and their sources connected to the power supplies. Other switching mechanisms, such as fully complementary MOSFET switches, which may be efficient in switching power from one source to another can be utilized to perform a multiplexing function. The power analyzer provides the control signals 1018–1019 to control the multiplexer 1004. As illustrated in FIG. 10, the control signals 1018 and 1019 are connected respectively to the gates of switching transistors 1008 and 1009. The power analyzer 1006 receives the DC supply voltage on node 510, the high level supply voltage 451, and the low level supply voltage 450. The power analyzer 1006 may receive additional control signals such as the sleep signal 1020 in order to provide additional power supply control to the power supplied to the device power 460. For example, the sleep signal 1020, when active in a sleep mode, may disable multiplexer 1004 from supplying any power to the device power line 460. In this manner, selective portions of circuitry may be powered on while others remained powered off in a sleep mode. The power analyzer compares the voltage between the high level supply voltage 451 and the low level supply voltage 450 with the voltage between the DC supply voltage on node 510 and the low level supply voltage 450. The analysis performed by the power analyzer can be basic or more complicated. Basic analysis would comprise comparing the two voltages and selecting one based on a predetermined selection scheme. For example, if the voltage on node 510 is greater than the voltage on line 451 by more than one half volt, then the power analyzer would activate switch 1008 to selectively couple the DC supply voltage on node 510 to the device power line 460. More complicated analysis would analyze the quality of the power sources and analyze the performance of any energy storage means 610 that may be used in order to determine which power supply to use. Preferably the analysis would include determining if a battery were dead and could no longer be charged. In this case, the power analyzer 1006 and the multiplexer 1004 cause transceiver 102 or 702 to be passive transceivers. That is, the transceiver 102 and 702 will still function but require being closer to a reader in order to power up and transmit any signals than would otherwise be necessary as compared to an active transceiver. In this manner the transceiver would function as a passive transceiver and would increase the useful life of an active transceiver if it ever were the case that a battery was low (i.e. required charging) or if the battery were to die or become non-rechargeable. Another complicated analysis the power analyzer 1006 may perform is to evaluate the number of times a rechargeable battery 610 has been recharged in order to more fully discharge a battery before recharging in order to avoid any memory effect in the rechargeable battery.

The present invention has many advantages over the prior art. The present invention provides a charging system without requiring physical contact with a charger. One advantage of the present invention is that it provides a wireless charging system that does not use expensive or bulky coils. Another advantage is that the present invention decreases the size of the charging components which increases the length of utility of a portable wireless device and allows a smaller device size. A still further advantage is that the present invention provides the capability of using lower cost components and thereby decreases the cost of manufacturing electrostatic rechargeable devices or electrostatic transceivers such as smart cards. Another advantage is that a third embodiment of the present invention is backward compatible so that it can be charged by an electrostatic system or an electromagnetic system. Another advantage is that a fourth embodiment of the rechargeable transceiver includes a power manager that can selectively choose to use power from an energy storage means or passive components excited by an electrostatic or electromagnetic field such that it can operate passively or actively.

The preferred embodiment of the present invention is thus described. While the present invention has been described in particular embodiments, the present invention should not be construed as limited by such embodiments, but rather construed according to the claims below.

What is claimed is:

1. A wireless electrostatic rechargeable device for being electrically charged by an electrostatic charge, the wireless electrostatic rechargeable device comprising:
   an energy storage means with a capacity to store energy to operate the wireless electrostatic rechargeable device;
   an electrostatic charge receiver, for receiving an electrostatic charge and converting it into an AC signal; and
   a rectifier, coupled to the electrostatic charge receiver and the energy storage means, for receiving the AC signal and providing a DC signal and for storing energy in the energy storage means,
   whereby the wireless electrostatic rechargeable device may be electrically charged by the electrostatic charge.

2. The wireless electrostatic rechargeable device of claim 1, wherein the energy storage means is selected from a group consisting of: a rechargeable battery, and a capacitor.

3. A wireless electrostatic rechargeable device for being electrically charged by an electrostatic charge, the wireless electrostatic rechargeable device comprising:
   an energy storage means with a capacity to store energy to operate the wireless electrostatic rechargeable device;
   an electrostatic charge receiver, for receiving an electrostatic charge and converting it into a first AC signal;
   a rectifier, coupled to the electrostatic charge receiver, for receiving the first AC signal and providing a DC signal;
   a voltage regulator, coupled to the rectifier, for receiving the DC signal and for regulating the DC signal to a DC voltage at a DC supply node; and
   a charge controller, coupled to the voltage regulator and the energy storage means, for storing energy in the energy storage means when the DC voltage is provided by the voltage regulator and preventing degradation of the energy storage means when the DC voltage is not sufficiently provided by the voltage regulator,
   whereby the wireless electrostatic rechargeable device may be electrically charged by the electrostatic charge.

4. The wireless electrostatic rechargeable device of claim 3, wherein the energy storage means is selected from a group consisting of: a rechargeable battery, and a capacitor.

5. The wireless electrostatic rechargeable device of claim 3, wherein the wireless electrostatic rechargeable device further comprises:
   an electromagnetic charge receiver, for receiving an electromagnetic charge and converting it into a second AC signal.

6. The wireless electrostatic rechargeable device of claim 5, wherein the electromagnetic charge receiver comprises:
   a coil for receiving the electromagnetic charge and converting it into the second AC signal.

7. The wireless electrostatic rechargeable device of claim 6, wherein the wireless electrostatic rechargeable device further comprises:

a second rectifier, coupled to the electromagnetic charge receiver, for receiving the second AC signal and providing the DC signal.

8. The wireless electrostatic rechargeable device of claim 3, wherein the electrostatic charge receiver comprises:
   a first electrostatic electrode, coupled to the rectifier; and
   a second electrostatic electrode, coupled to the rectifier,
   wherein at least one of the first electrostatic electrode and the second electrostatic electrode receive the electrostatic charge.

9. The wireless electrostatic rechargeable device of claim 8, wherein the rectifier is selected from a group consisting of: a full-wave rectifier, and a half-wave rectifier.

10. The wireless electrostatic rechargeable device of claim 3, wherein the charge controller is selected from a group consisting of: a non-controllable type charge controller, and a variable type charge controller.

11. The wireless electrostatic rechargeable device of claim 3 further comprising:
   a power manager, coupled to the voltage regulator and the energy storage means, for performing an analysis of the energy supplied by the voltage regulator and the energy storage means, and for selectively coupling the energy storage means or the voltage regulator to circuitry within the wireless electrostatic rechargeable device responsive to the analysis,
   whereby the wireless electrostatic rechargeable device can operate with or without the energy storage means.

12. The wireless electrostatic rechargeable device of claim 11, wherein the power manager comprises:
   a power analyzer, coupled to the voltage regulator and the energy storage means, for analyzing the energy supplied by the voltage regulator and the energy storage means and for generating a control signal; and
   a multiplexer, coupled to the power analyzer, the voltage regulator, the energy storage means and circuitry within the wireless electrostatic rechargeable device, for receiving the energy supplied by the voltage regulator and the energy storage means, and for selectively coupling the energy supplied by the voltage regulator or the energy storage means to circuitry within the wireless electrostatic rechargeable device in response to the control signal.

13. A rechargeable device, comprising:
   an energy storage means with a capacity to store energy to operate the rechargeable device;
   a charge receiver, for receiving an excitation signal and converting it into an AC signal;
   a rectifier, coupled to the charge receiver, for receiving the AC signal and providing a DC signal;
   a voltage regulator, coupled to the rectifier, for receiving the DC signal and providing a DC voltage; and
   a charge controller, coupled to the voltage regulator and the energy storage means, for storing energy in the energy storage means when the DC voltage is provided by the voltage regulator and preventing degradation of the energy storage means when the DC voltage is not sufficiently provided by the voltage regulator,
   whereby the rechargeable device may be electrically charged by the excitation signal;
   whereby the charger may recharge the electrostatic rechargeable device.

14. The rechargeable device of claim 13, wherein the rechargeable device is selected from a group consisting of: an electrostatic rechargeable device having, a electromagnetic rechargeable device, and a combination electrostatic/electromagnetic rechargeable device.

15. The rechargeable device of claim 13 wherein the energy storage means is selected from a group consisting of: a rechargeable battery, and a capacitor.

16. The rechargeable device of claim 13, wherein the charge receiver comprises:
   a first electrostatic electrode, coupled to the rectifier; and
   a second electrostatic electrode, coupled to the rectifier,
   wherein at least one of the first electrostatic electrode and the second electrostatic electrode receive an electrostatic charge.

* * * * *